United States Patent [19]

Jablonowski

[11] 4,286,293
[45] Aug. 25, 1981

[54] LASER SCANNING AND MULTIPLE DETECTION FOR VIDEO IMAGE PROCESSING

[75] Inventor: Donald P. Jablonowski, Dunwoody, Ga.

[73] Assignee: Western Electric Company, Inc., New York, N.Y.

[21] Appl. No.: 43,953

[22] Filed: May 30, 1979

[51] Int. Cl.³ ............................................... H04N 3/02
[52] U.S. Cl. ..................................... 358/199; 358/200
[58] Field of Search .............. 358/101, 106, 107, 200, 358/208, 284, 285, 293, 209, 199, 282, 110, 206; 250/209, 224, 225, 562, 563, 572, 578, 571, 557, 560, 561; 356/222, 237, 364, 369, 430, 445, 448

[56] References Cited

U.S. PATENT DOCUMENTS

| | | | |
|---|---|---|---|
| 3,549,263 | 12/1970 | Osawa et al. | 356/445 |
| 3,591,291 | 7/1971 | Greer | 356/448 |
| 3,725,666 | 4/1973 | Berthold | 250/572 |
| 3,748,484 | 7/1973 | Covault | 356/369 |
| 3,850,526 | 11/1974 | Corey | 250/571 |
| 3,901,602 | 8/1975 | Gravatt | 356/364 |
| 3,922,093 | 11/1975 | Dandliker | 250/571 |
| 3,971,956 | 7/1976 | Jakeman et al. | 250/571 |
| 3,977,789 | 8/1976 | Hunter et al. | 356/237 |
| 4,030,830 | 6/1977 | Holly | 356/237 |
| 4,092,068 | 5/1978 | Lucas et al. | 250/572 |
| 4,146,799 | 3/1979 | Pitt et al. | 250/574 |
| 4,152,723 | 5/1979 | McMahon et al. | 358/106 |

OTHER PUBLICATIONS

Frazee et al., "Laser Inspection System for Gold Contact Fingers," *Western Electric Technical Digest*, No. 35, Jul. 1974, pp. 25, 26.
Rowley, "Laser TV Camera Systems", SPSE Seminar, 1968, pp. 247-252.

*Primary Examiner*—John C. Martin
*Attorney, Agent, or Firm*—D. J. Kirk

[57] ABSTRACT

An object (12) is raster scanned with a small, localized beam of laser light (22) and the backscattered radiation therefrom is monitored by a plurality of detectors (44). Each of the detectors (44) monitors a different characteristic of the backscattered radiation and an arithmetic operation is performed on the output of the detectors to provide a single composite video signal with enhanced contrast.

6 Claims, 8 Drawing Figures

LASER SCANNING AND MULTIPLE DETECTION FOR VIDEO IMAGE PROCESSING

TECHNICAL FIELD

This invention is related to a method and apparatus for obtaining a video signal. In particular, the invention is directed to a method and apparatus for obtaining an enhanced video signal using object scanning techniques.

BACKGROUND OF THE INVENTION

Conventional video cameras are image scanning devices. A video signal is acquired by imaging an object scene to a remote surface and converting the illuminance at that surface to an electrical signal. For vidicons, the conversion is made by scanning an electron beam over a photoconductive surface.

Manufacturing processes are finding increased utility for such video systems. The obvious use has been for remote observation, where an operator is aided by a camera and monitor in examining a part for alignment, measurement or inspection. More recently, video signals have been processed electronically for automatic recognition of image content, thereby eliminating subjective human observation and judgment. Advantages of increased speed, adaptability and reliability are realized with such automatic image processing, and its use for manufacturing processes is expected to increase in the future.

In most cases, recognition of image content is made by noting the variations in the video signal level. Large variations are obviously desirable, particularly in instances where automatic image processing is to be performed. Signal levels representing different image detail are often separated with thresholding circuitry to produce binary images (0 or 1); in this form, automatic image processing is most readily performed. This necessarily implies the need for a high contrast image or a change in video gain to increase the video signal variations. However, in many instances, the contrast is low, making the transformation to a binary image difficult or impossible.

One technique that has been used to improve the contrast of a video signal is described in an article titled "Laser TV Camera Systems" in *The Proceedings of SPSE Seminar,* 1968, by R. S. Rowley. That article describes a system in which a laser beam is raster scanned over the surface of an object and a detector monitors the light reflected from the object. The detected reflections are converted into a video signal which is amplified and presented directly to the video input of a TV for display. Such an arrangement is referred to as object scanning and eliminates the requirement of a video camera and imaging optics. Although such a technique can be most effective when outside illumination is poor or non-existent, the video signal contrast is improved only slightly compared to that produced with image scanning devices.

Accordingly, there is a need for a technique for obtaining an enhanced video signal which increases the video contrast and is amenable to automatic recognition of image content in order to eliminate subjective human observation and judgment.

SUMMARY OF THE INVENTION

The instant invention provides such a technique for obtaining an enhanced video signal which represents the surface of an object by scanning a small, localized beam of illumination over the surface of the object and detecting the scattered radiation therefrom with a plurality of detectors. A video signal is generated at the output of each detector, each video signal representing a different characteristic of the scattered radiation. The video signals from all the detectors are combined to form a composite video signal having enhanced contrast.

DETAILED DESCRIPTION

The present invention is directed towards performing certain video image processing steps at the input transducer. Such a concept removes the vidicon or other camera as an image-to-video transducer and replaces it with apparatus that is more adaptable to the object's physical characteristics. These characteristics would include not only reflectance, but others such as surface roughness. The result is a video signal that has been preprocessed to exhibit information in a form that is easily handled by automatic image processing hardware or readily recognized via observation of a monitor.

Figure 1:
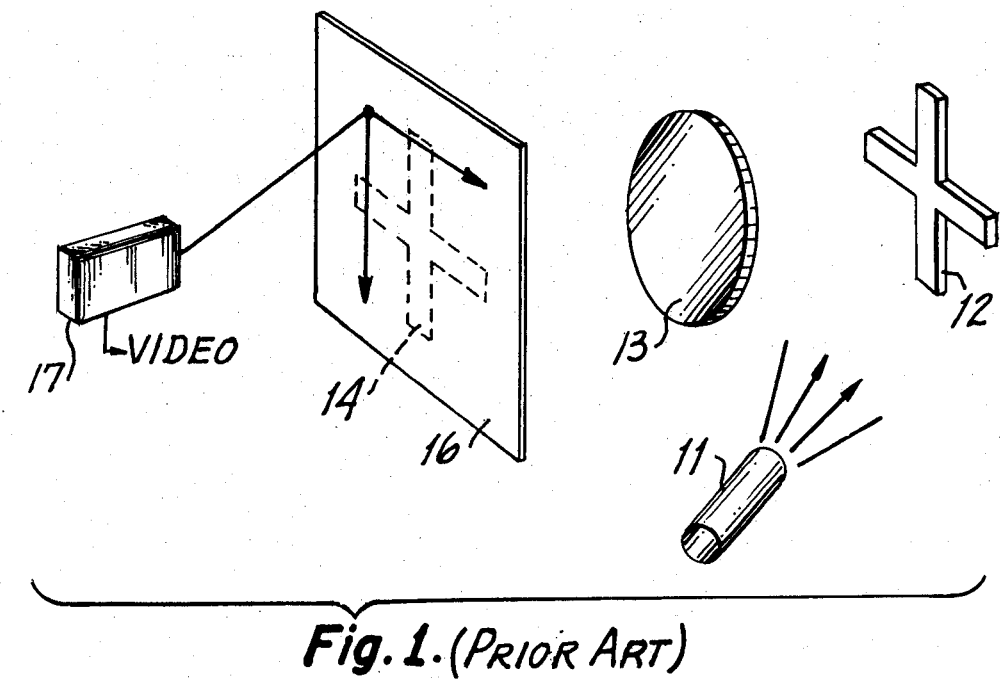
FIGS. 1 and 2 provide a comparison of image scanning and object scanning, respectively.

Object scanning as opposed to image scanning is used to implement the instant techniques. In image scanning (FIG. 1), a wide area illumination source 11 is directed at an object 12. Imaging optics 13 focuses an image 14 of the object 12 in the image plane 16. An image scanner 17 scans the image plane 16 and converts the illuminance at that plane into a video signal.

In object scanning (FIG. 2), a scanner 21 scans the object 12 with a beam of localized light 22 and a detector 23 detects the reflected light which is converted into a video signal.

The instant approach combines the concept of object scanning with the use of a plurality of detectors to provide a more informative signal from the object scanned. This information can be processed advantageously to obtain an enhanced, composite, video signal according to the characteristics of the object scanned.

Figure 3:
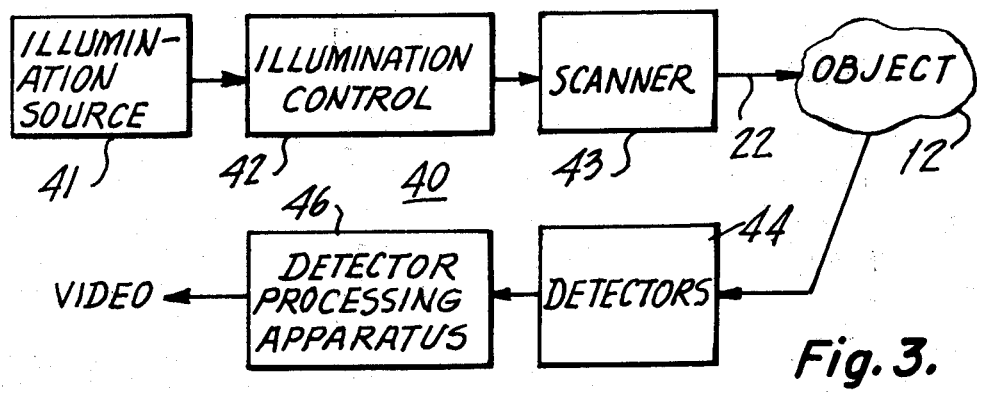
FIG. 3 is a block diagram depicting the instant inventive techniques.

FIG. 3 depicts the basic components of the instant object scanning apparatus, generally designated by the numeral 40. An illumination source 41, an illumination control 42 and a scanner 43 are arranged to produce a localized scanning spot on the object 12. A plurality of detectors 44—44 have outputs connected to a detector processor 46 which processes the plurality of video signals from the detectors to realize a single composite video signal having improved contrast. The enhanced video signal can be used for monitor viewing or image processing as hereinbefore indicated.

A variety of illumination sources 41 may be employed; however, use of a laser (e.g., HeNe; GaAs; HeCd; Argon; YAG; etc.) offers significant advantages. Since lasers are well collimated sources, they are easily focused to produce a localized spot of high illuminance. Their monochromaticity allows detection even with ambient lighting, using interference filters. The illumination control 42 may be one of a variety of electro-optic devices which provide rapid modulation or shaping of the laser beam.

The scanner 43 provides high-speed beam deflection. Acousto-optic and mechanical deflectors such as galvanometer controlled mirrors and multi-faceted spinning mirrors are logical choices for such beam deflection. The specific type is dependent upon required resolution, linearity, scan rate and scan geometry. Acousto-optic deflectors can provide high scan rates with variable scan geometry and good linearity. However, the resolution is not as high as can be obtained with mechanical deflectors. On the other hand, high scan rates are not easily obtained with mechanical deflectors and the scan geometry is somewhat fixed.

The detectors 44 may be one of any number of available components. Well-known silicon photodiodes and photomultiplier tubes are two of the most useful devices. The detector processing apparatus 46 may be comprised of various electronic circuits to operate on the outputs of the detectors 44 to provide an enhanced video signal as will hereinafter be described.

Figure 2:
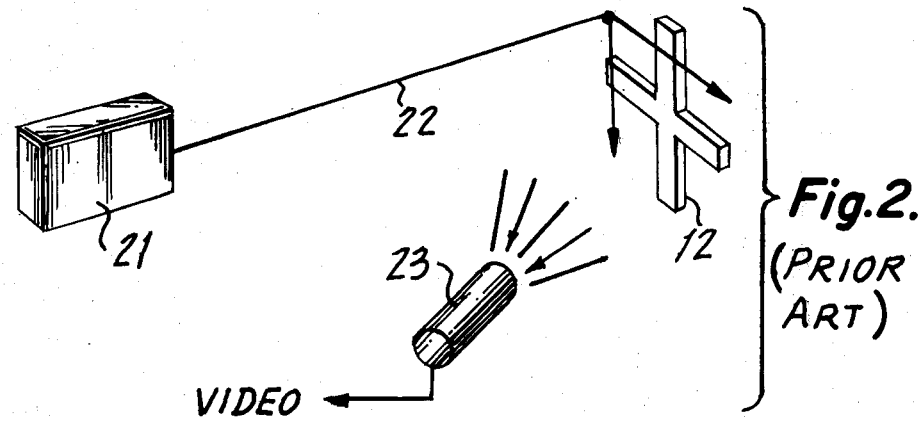

A certain amount of information concerning the object 12 can be obtained with a single detector 23 as shown in FIG. 2; however, substantially more information is available by the proper application of multiple detectors 44—44 with an an appropriate electronic processing of the output of the detectors.

Figure 4:
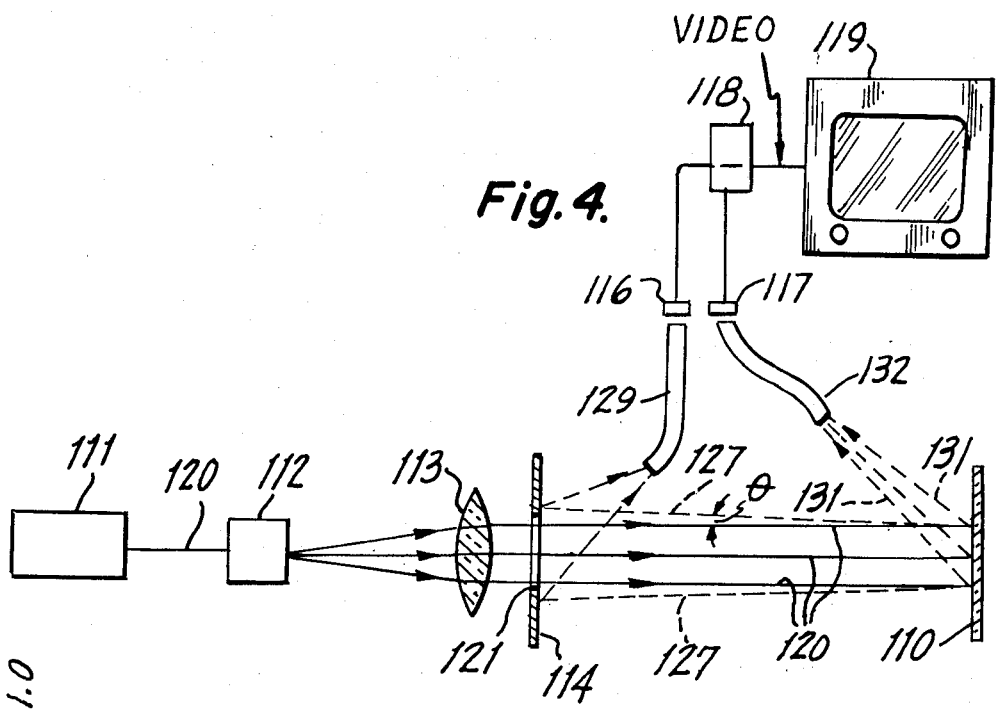
FIG. 4 is a schematic drawing showing the use of two detectors to enhance the video signal associated with gold on ceramic.

An exemplary embodiment for obtaining an enhanced video signal contrast of gold thin film patterns (not shown), on a ceramic substrate 110 with an object scanning system is shown in FIG. 4. The apparatus is comprised of a laser 111, X-Y deflectors 112, a scan lens 113, an apertured plate 114, first and second detectors 116 and 117, respectively, a signal processor 118 and a TV monitor 119.

Figure 5:
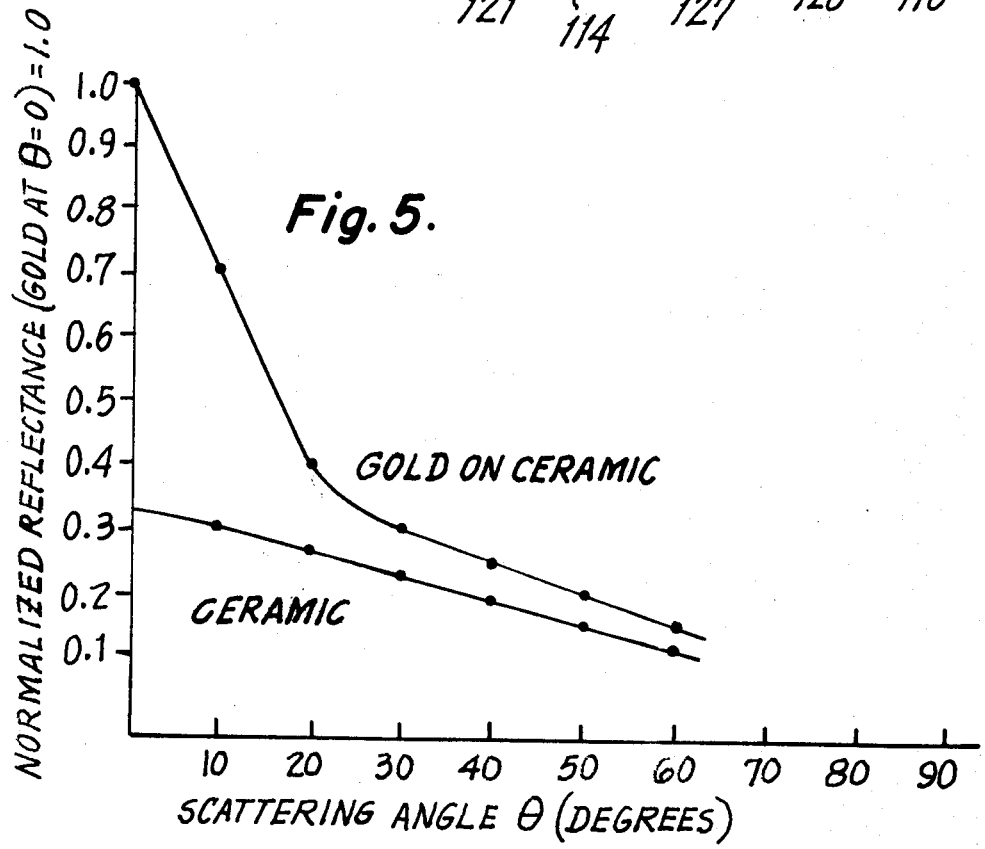
FIG. 5 shows curves of scattering profiles of ceramic and gold thin film on ceramic.

Prior to the operation of the system, the scattering profiles for the gold thin film and the ceramic 110 were measured experimentally for normal illumination by a HeNe laser. The results, shown in FIG. 5, indicate major variations in the scattering profile. Use of a single detector for maximum contrast would imply operation at $\theta=0$, with a 3:1 contrast ratio. Owing to variations in the video signal caused by illuminance and reflectance differences, this contrast ratio is not sufficient for automatic image processing applications. On the other hand, improved video contrast can be realized by identifying the scattering profile, using two spaced apart detectors. In particular, a slope calculation is made on the profile by subtracting the signal detected at a high angle (e.g., 40°-50°) from a low angle signal (e.g., 5°-10°). The difference signal, representing the slope of the scattering profile, is then used as the video signal.

Figure 6:
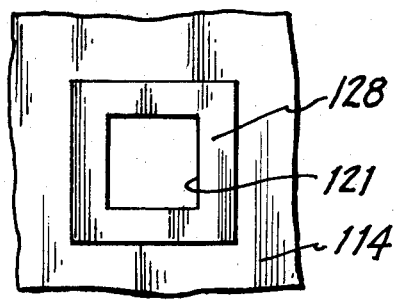
FIG. 6 is a front view of an apertured plate used in one embodiment of the instant invention.

In operation (see FIG. 4), a beam 120 from the laser 111 is deflected by the deflectors 112, via the scan lens 113, through an opening 121 in the apertured plate 114 (see FIG. 6) to raster scan the ceramic substrate 110 having the gold pattern (not shown) thereon. The gold, being specular, will reflect the laser beam 120 at a low angle as indicated by beams 127—127 which are further reflected from a white diffuser paper 128, bordering the aperture 121 on the plate 114 (see FIG. 6), onto the first (low angle), detector 116 via a first optical waveguide 129.

When the laser beam 120 strikes the ceramic surface, which is a diffuse surface, a portion thereof will also be reflected as the beam 127, in addition, a portion will be reflected as beams 131 at a high angle. The beams 131 are received by the second (high angle) detector 117 via a second optical waveguide 132. The signal amplitude output from the second detector 117 is subtracted from the output of the first detector 116 in the signal processor 118 and the resultant composite video signal is forwarded to, and displayed on, the TV monitor 119 and/or forwarded to automatic processing equipment. By proper scaling of each signal, the signal level due to the light reflected from the ceramic surface detected by the second detector 117 may be reduced to zero (black video level), while the signal level due to the light reflected from the gold surface which is detected by the first detector 116 remains at a bright level resulting in a high contrast video signal.

Figure 7:
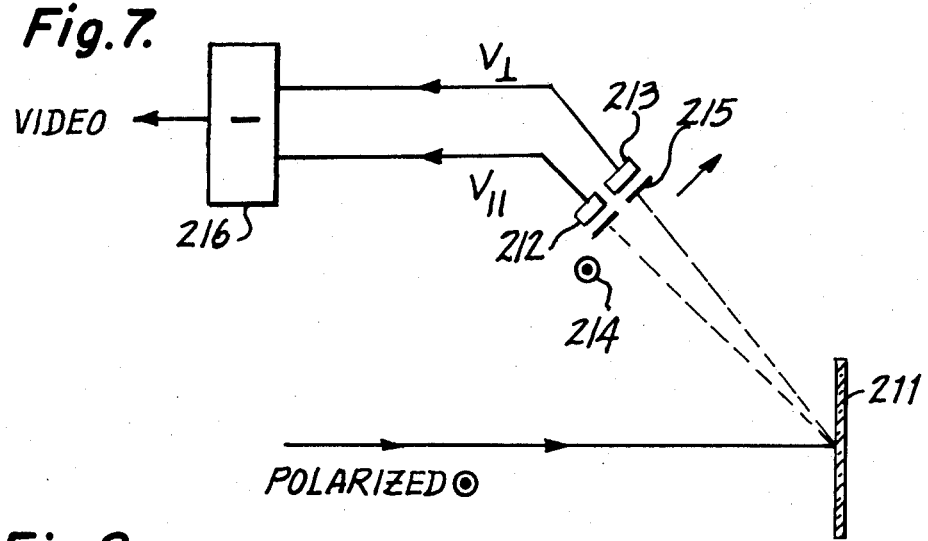
FIG. 7 depicts the monitoring of backscattered radiation from a thick film circuit using polarization differences.

A second illustrative embodiment, shown in FIG. 7, utilizes variations in the polarization of the backscattered light. The object in this example is a thick film circuit 211 having a metallic conductor (e.g. silver) on a ceramic substrate. When illuminated with linearly polarized light, the diffusive substrate material will depolarize the backscattered radiation through a multiple scattering process. The metal surface, on the other hand, will reflect a linearly polarized beam with relatively little change in polarization. As a result, two detectors with polarization filters can be employed, as shown in FIG. 7. A first detector 212 through a parallel polarizer 214 monitors that portion of the backscattered light that retains the polarization of the incident light, while a second detector 213 mounted proximate the first detector monitors the orthogonal component of the light via a crossed polarizer 215. The outputs of the first and second detectors 212 and 213 are two distinct video signals, each possessing information pertaining to the surface material of the thick film circuit 211.

With suitable processing, the video signals generated by the first and second detectors 212 and 213 can be used to form a composite video with optimum contrast. For example, if both polarization components are substantially equal, depolarization has occurred, implying the presence of the diffusive ceramic material. On the other hand, if the parallel component $V_\parallel$ is much larger than the orthogonal component $V_\perp$, the reflection is coming from the specular metal surface. By subtracting the video signal at the output of the detector 213 from the output of the detector 212, in a processor 216, a composite video signal will result with the ceramic material at the zero video level and the metallic surfaces at a high (bright) video level, thereby producing a maximum video contrast between the metal and the ceramic material.

Figure 8:
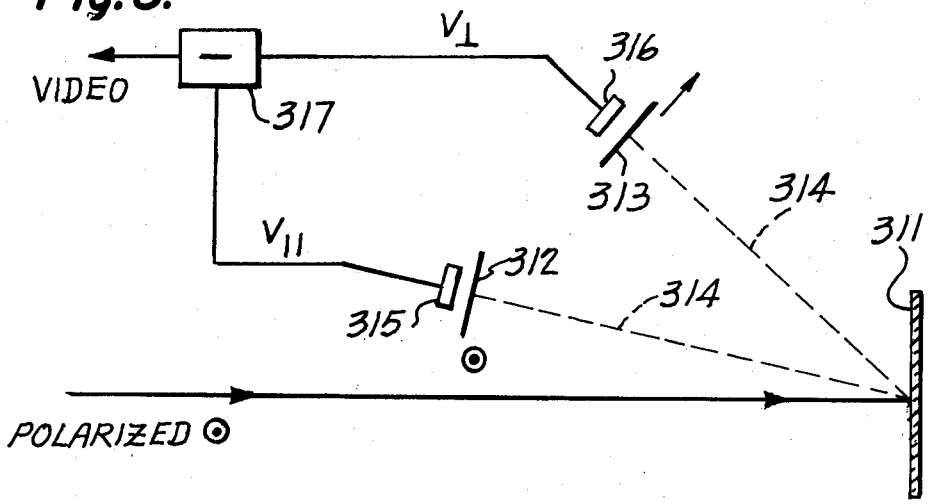
FIG. 8 depicts an apparatus for forming a video signal of a printed wiring board utilizing scattering profiles and polarization differences.

In a further exemplary embodiment shown in FIG. 8, the use of the aforementioned scattering profiles and polarization techniques can be combined. A printed wiring board 311 having solder coated conductors (not shown) on an epoxy-glass base displays scattering characteristics that allow both techniques to be employed. The solder has a narrower scattering profile than the epoxy-glass. Moreover, the epoxy-glass depolarizes the incident radiation, while the solder does not. Accordingly, a parallel polarizer 312 and a crossed polarizer 313 are mounted in spaced relation and the backscattered radiation 314 detected and converted into electrical signals by first and second detectors 315 and 316, respectively. The signal output of the second detector 316 is subtracted from the output of the first detector 315 in a processor 317 to compute the slope of the scattering profile as hereinbefore described. However, the use of the crossed polarizer 313 at the high angle alters the signal due to the backscattered radiation from the solder to increase its slope measurement without appreciably changing the reading from the epoxy-glass, which is the same regardless of the polarization resulting in a video signal having enhanced contrast.

Although the exemplary embodiments depict monitoring of the radiation that is backscattered from the surface of an object, the invention is not so limited, for it is contemplated that other areas of radiation such as forward scattering of light may also be effective in particular applications.

Additionally, although each embodiment of the invention was described in relation to a specific object being scanned (e.g., gold on ceramic; printed wiring board; thick film on ceramic), it should be clear that all of the exemplary techniques described can be implemented on all the objects described. Furthermore, other objects may advantageously be scanned using the present concepts. For instance, polished semiconductor wafers having defects thereon which will diffuse light directed thereat may be scanned using the instant methods and apparatus to obtain a composite video signal having enhanced contrast. The composite video signal may then be used in a television to display the surface of the wafer with the defects thereon.

What is claimed is:

1. A method for obtaining an enhanced video signal, representing a ceramic substrate having a metallic pattern thereon, the method comprising the steps of:
    raster scanning a narrow beam of illumination over the surface of the patterned substrate;
    monitoring radiation scattered by the scattered substrate with a plurality of detectors wherein a first detector detects radiation scattered at low angles by the surface of the patterned substrate while a second detector detects the radiation scattered at high angles by said surface;
    generating a video signal at the output of each detector, each video signal representing the scattered radiation impinging thereon; and
    subtracting the video output of the second detector from the first detector to form a composite video signal having enhanced contrast.

2. A method for obtaining an enhanced video signal, representing a printed wiring board having a metallic pattern thereon, the method comprising the steps of:
    raster scanning a narrow beam of illumination over the surface of the printed wiring board;
    monitoring radiation scattered by the surface of the printed wiring board with a plurality of detectors wherein a first detector detects radiation scattered at low angles by the surface while a second detector detects the radiation scattered at high angles by said board surface;
    generating a video signal at the output of each detector, each video signal representing the scattered radiation impinging thereon; and
    subtracting the video output of the second detector from the first detector to form a composite video signal having enhanced contrast.

3. A method for obtaining an enhanced video signal representing a polished semiconductor wafer having diffusive portions on the surface thereof, the method comprising the steps of:
    raster scanning a narrow beam of illumination over the surface of the wafer;
    monitoring radiation scattered by the surface of the wafer with a plurality of detectors wherein a first detector detects radiation scattered at low angles by the surface of the wafer while a second detector detects the radiation scattered at high angles by said surface;
    generating a video signal at the output of each detector, each video signal representing the scattered radiation impinging thereon; and
    subtracting the video output of the second detector from the first detector to form a composite video signal having enhanced contrast.

4. A method for obtaining an enhanced video signal representing a ceramic substrate having a metallic pattern thereon, the method comprising the steps of:
    raster scanning a narrow beam of polarized illumination over the surface of the patterned substrate;
    monitoring the radiation scattered by the surface of the patterned substrate with a plurality of detectors wherein a first detector detects a parallel component of the radiation scattered at low angles by the surface while a second detector detects an orthogonal component of the radiation scattered at high angles by said surface;
    generating a video signal at the output of each detector, each video signal representing the scattered radiation impinging thereon; and
    subtracting the video output of the second detector from the first detector to form a composite video signal having enhanced contrast.

5. A method for obtaining an enhanced video signal representing a printed wiring board having a metallic pattern thereon, the method comprising the steps of:
    raster scanning a narrow beam of polarized illumination over the surface of the printed wiring board;
    monitoring the radiation scattered by the surface of the board with a plurality of detectors wherein a first detector detects a parallel component of the radiation scattered at low angles by the surface while a second detector detects an orthogonal component of the radiation scattered at high angles by said surface;
    generating a video signal at the output of each detector, each video signal representing the scattered radiation impinging thereon; and
    subtracting the video output of the second detector from the first detector to form a composite video signal having enhanced contrast.

6. A method for obtaining an enhanced video signal representing a polished semiconductor wafer having diffusive portions on the surface thereof, the method comprising the steps of:
    raster scanning a narrow beam of polarized illumination over the surface of the wafer;
    monitoring the radiation scattered by the surface of the wafer with a plurality of detectors wherein a first detector detects a parallel component of the radiation scattered at low angles by the surface while a second detector detects an orthogonal component of the radiation scattered at high angles by said surface;
    generating a video signal at the output of each detector, each video signal representing the scattered radiation impinging thereon; and
    subtracting the video output of the second detector from the first detector to form a composite video signal having enhanced contrast.

* * * * *